United States Patent [19]
Matsuo et al.

[11] 3,958,780
[45] May 25, 1976

[54] CONVERTIBLE CANOPY-TO-WING SHAPED PARACHUTE

[75] Inventors: Jon T. Matsuo, El Centro, Calif.; Lajpat Utreja, Huntsville, Ala.

[73] Assignee: The United States of America as represented by the Secretary of the Navy, Washington, D.C.

[22] Filed: Apr. 9, 1975

[21] Appl. No.: 566,459

[52] U.S. Cl. ............................................. 244/152
[51] Int. Cl.² .......................................... B64D 17/34
[58] Field of Search ........... 244/142, 152, 145, 147, 244/149, DIG. 1

[56] References Cited
UNITED STATES PATENTS

| | | | |
|---|---|---|---|
| 2,784,927 | 3/1957 | Turolla | 244/152 |
| 2,919,085 | 12/1959 | Horning | 244/152 |
| 3,117,753 | 1/1964 | Ewing | 244/152 |
| 3,170,661 | 2/1965 | Basnett | 244/152 |
| 3,578,275 | 5/1971 | Kriesel et al. | 244/152 |
| 3,599,908 | 8/1971 | Martin | 244/152 |
| 3,779,489 | 12/1973 | Matsuo | 244/152 |
| 3,837,604 | 9/1974 | Matsuo | 244/152 |
| 3,866,862 | 2/1975 | Snyder | 244/152 |

FOREIGN PATENTS OR APPLICATIONS

| | | | |
|---|---|---|---|
| 411,741 | 6/1945 | Italy | 244/152 |
| 1,051,709 | 12/1966 | United Kingdom | 244/149 |
| 1,230,319 | 12/1966 | Germany | 244/142 |

Primary Examiner—Trygve M. Blix
Assistant Examiner—Galen L. Barefoot
Attorney, Agent, or Firm—R. S. Sciascia; G. J. Rubens

[57] ABSTRACT

A standard hemispherical parachute canopy can be converted optionally by the parachutist during a deployment from its fully inflated dome-shaped condition to a high lift-over-drag configuration to enable the parachute to be propelled and maneuvered to a desirable pick up area to avoid capture by the enemy during wartime conditions, and to minimize injury by selecting a more favorable terrain for landing.

3 Claims, 8 Drawing Figures

*GLIDING MODE*

NO GLIDE MODE

GLIDING MODE

GLIDING MODE

CONVERTIBLE CANOPY-TO-WING SHAPED PARACHUTE

BACKGROUND OF THE INVENTION

This invention relates to parachute construction, and more particularly to a parachute canopy that can be converted by the parachutist from one having a standard canopy configuration, to a wing-shaped canopy having a high lift-over-drag configuration.

Maneuverable gliding parachutes are within the state-of-the-art, with most of the past development being devoted to sport applications. Glidable parachutes have been unacceptable for military applications because inherently of the relatively long opening times in escape applications at low speeds and low altitudes deployments. Furthermore, glidable sport-type parachutes cannot withstand high opening shocks frequently encountered in deployment from military aircraft at high speed, without serious structural damage to some part of the canopy.

An effort to convert the conventional standard canopy into a gliding parachute has been successfully demonstrated by one of the present applicants in his U.S. Pat. No. 3,779,489. However, in that invention the primary purpose was to provide a steerable parachute by controlling the air exhaust from the channel formed in the canopy by the release of four of the aft suspension lines. The lift-over-drag ratio for such a parachute canopy varies from 0.3 to 0.5.

Similar modifications of the canopy drag surface to obtain a steerable parachute is also represented by U.S. Pat. Nos. 2,458,264 and 3,117,753.

SUMMARY OF THE INVENTION

A convertible parachute canopy is proposed which can be changed optionally by the parachutist from a standard, symmetrical dome-shaped configuration to a wing-type configuration having a high lift-to-drag ratio in the order of up to 1.0. In this manner, all the advantages of the standard parachute for normal deployments at low and high speed are retained. However, if after initial deployment with the conventional canopy descending primarily vertically, if the parachutist should require to steer the parachute in a more horizontal flight for any reason, the canopy can be converted readily into a wing-type, sail configuration. Transformation of the canopy to a high lift-over-drag surface provides a more efficient, aerodynamic configuration utilizing the vertical as well as horizontal components of the descending airspeed vector.

A greater control over the configuration of the converted aerodynamic wing is maintained by use of a pull down vent line in conjunction with variable length suspension lines, which line may be lengthened or shortened depending on the specific construction. Various means are provided for selectively varying the length of the suspension lines.

STATEMENT OF THE OBJECTS OF THE INVENTION

A principal object of this invention is to provide a standard parachute canopy having a zero lift with the capability of being converted into a high lift-to-drag aerodynamic wing-shaped surface that can be propelled and steered by the parachutist.

Another important object is to provide a parachute canopy that can be converted into a more efficient gliding surface having a lift-to-drag ratio of up to one without requiring a structural modification of the drag surface.

A further important object is to provide a convertible canopy having a substantial number of variable length suspension lines which can be released incrementally.

Other objects, advantages and novel features of the invention will become apparent from the following detailed description of the invention when considered in conjunction with the accompanying drawings.

DESCRIPTION OF THE PREFERRED EMBODIMENTS

Figure 1A:
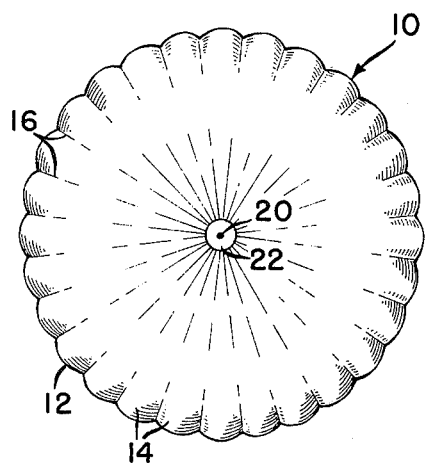
FIGS. 1 and 1a are side elevation and top plan views, respectively, of a fully inflated, standard military-type parachute canopy shown in a normal deployment.
Figure 1:
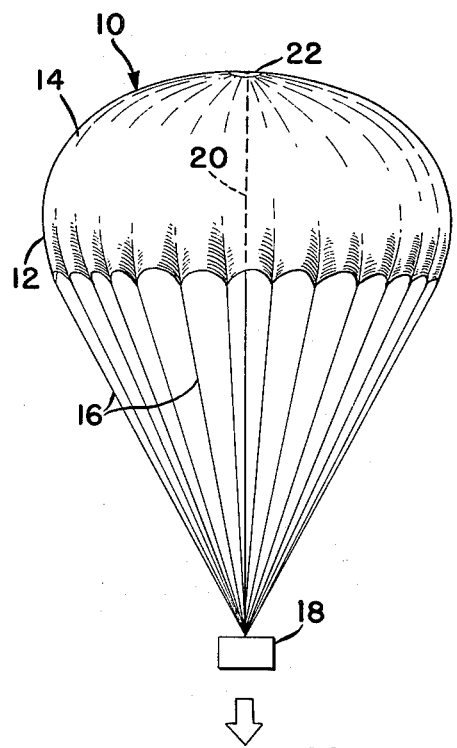

Referring the the drawings where line reference numerals refer to similar parts throughout the figures there is shown in FIGS. 1 and 1a, a typical parachute 10 currently used in military aircrew parachute escape systems, having a 28 foot diameter flat, circular canopy drag surface 12. The illustrated drag surface 12 is provided with 28 gores 14, and a like number of suspension lines 16 connected in the usual manner to a load 18. It is obvious that this specific parachute is illustrative of only one of many different canopies on which this novel invention can be utilized.

Parachute 10 in FIGS. 1 and 1a is shown in a normal, fully inflated condition wherein the drag surface is circular and dome-shaped, which is the configuration utilized for normal descent. In such a condition, and disregarding any wind conditions, the lift-to-drag (L/D) ratio is substantially zero, that is, there is no glide component, and the parachute descends only vertically.

However, there is a military requirement for a parachute having a maneuverable capability as an aid in achieving a more successful rescue operation. With such a parachute, the parachutist can deliberately choose his landing area with the consideration of avoiding capture; of minimizing injury by selecting favorable terrain; and of expediting his rescue by preventing inadvertent concealment; or of choosing an area accessible to direct helicopter pickup. With a parachute canopy that can be readily converted to a wing-like construction having a high lift-to-drag ratio, a parachutist ditching over coastal waters has a better opportunity of reaching a safer landing on a land mass, instead of landing directly in the water.

In the present invention, parachute 10 is given an optional glide capability by providing a preselected number of releasable, variable length suspension lines. Some specific means by which the suspension lines are made releasable will be described later with reference to FIGS. 4 and 5.

Figure 2A:
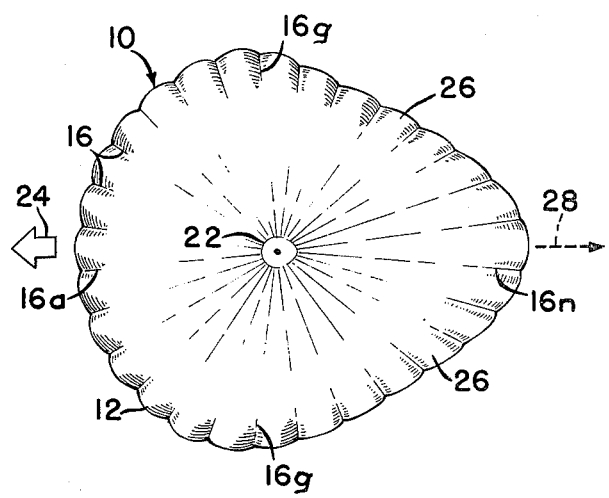
FIGS. 2 and 2a are side elevation and top plan views, respectively, of the parachute in FIGS. 1 and 1a after the parachutist has exercised his option to utilize the present invention to convert the canopy to one having a high lift-to-drag configuration.
Figure 2:
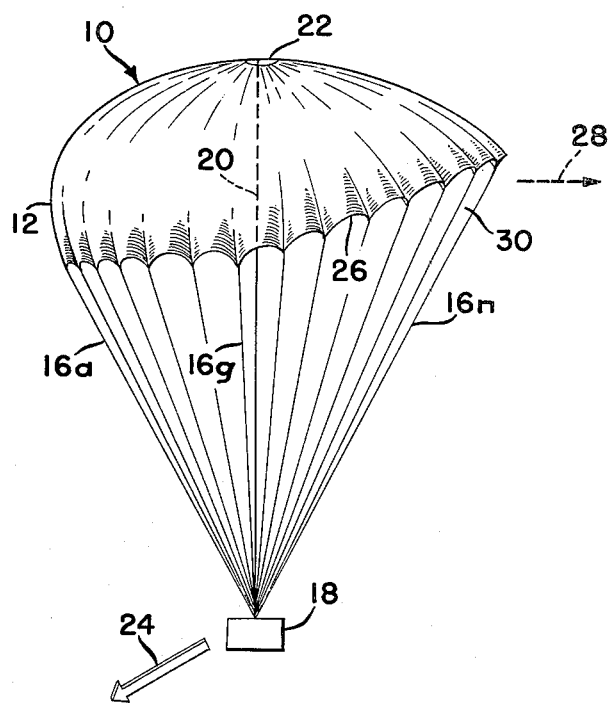
Figure 3A:
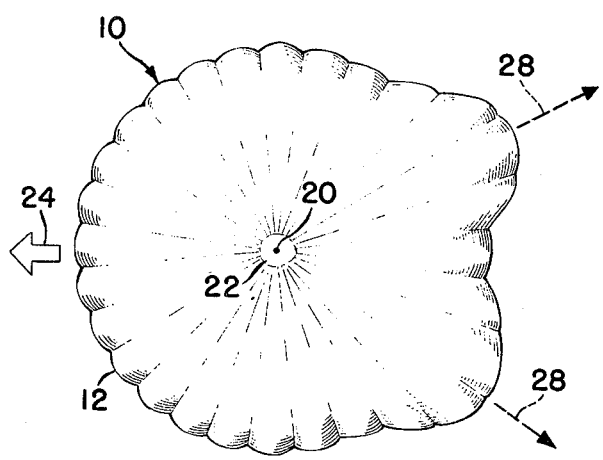
FIGS. 3 and 3a are side elevation and top plan views, respectively, of another optional high lift-to-drag parachute configuration that provides two air exhaust channels on the aft end of the respective drag surface for steering purposes.
Figure 3:
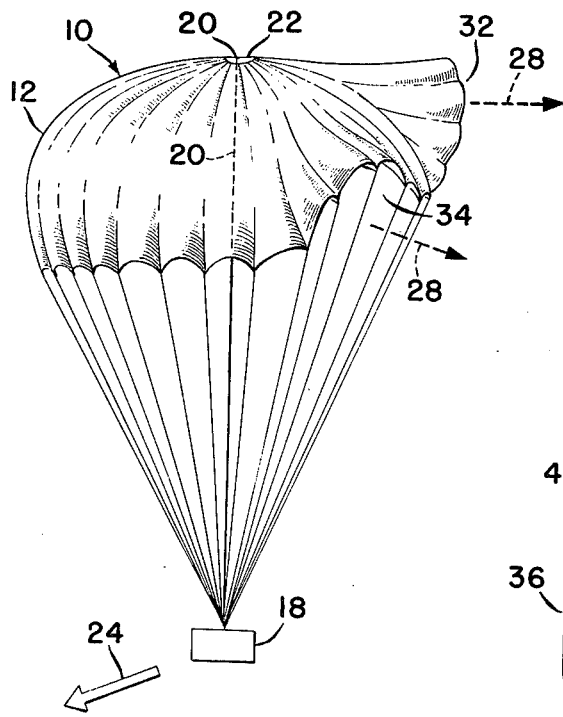

In addition to making a selected number of suspension lines variable in length, the employment of a pull down vent line (PDVL) 20 is also necessary in order to adequately achieve the goal of converting the standard dome-shaped canopy into the wing-shaped configuration of FIGS. 2 and 3. For certain parachute deployments, pull down vent line 20 can also be made variable in length.

In the optional use of the parachute, the purpose of pull down vent line 20 is to force the dome-shaped drag surface in FIG. 1 to assume a flattened airfoil configuration when the releasable suspension lines are let out. As shown, pull down vent line is connected at one end to load 18 and the upper end around canopy vent 22, if one is provided.

As shown in FIGS. 2 and 2a, the converted drag surface 12 will be gliding in the direction of solid line arrow 24. To obtain the configuration of FIGS. 2 and 2a, all of the suspensions aft of the canopy center, on both port and starboard sides thereof, are made variable in length gradually increasing in length from suspension line 16g to suspension line 16n, the latter being the longest. In such an arrangement of suspension lines, the top plan view shows the drag surface 12 assuming a tear-drop configuration. In elevation, variable suspension lines 16g to 16n, on both lateral sides of flattened drag surface 12, has caused the aft half of canopy hem 26 to tilt upwardly; forming an air exhaust channel 28. The forward half of the hem will remain substantially horizontal as the respective suspension lines are not extendable. Pull down vent line 20 causes the top of drag surface 12 to assume a flattened shape.

As captured air under drag surface 12 will spill out of exhaust channel 28 rearwardly into the direction of broken arrow 30, the flattened drag surface 12 will cause the parachute to glide forwardly and downwardly simultaneously in the direction of solid arrow 24. The horizontal distance that the parachute will glide depends on numerous factors such as the lift-to-drag ratio; the elevation at which the canopy is converted into the glide mode; wind and temperature conditions.

In FIGS. 3 and 3a, the aft suspension lines of canopy 12 differ in length, compared to FIGS. 2 and 2a. This arrangement provides two spaced air exhaust channels 32 and 34 directed rearwardly toward broken arrow 28, which provide the parachute with a gliding mode in the direction of solid arrow 24.

Figure 4:
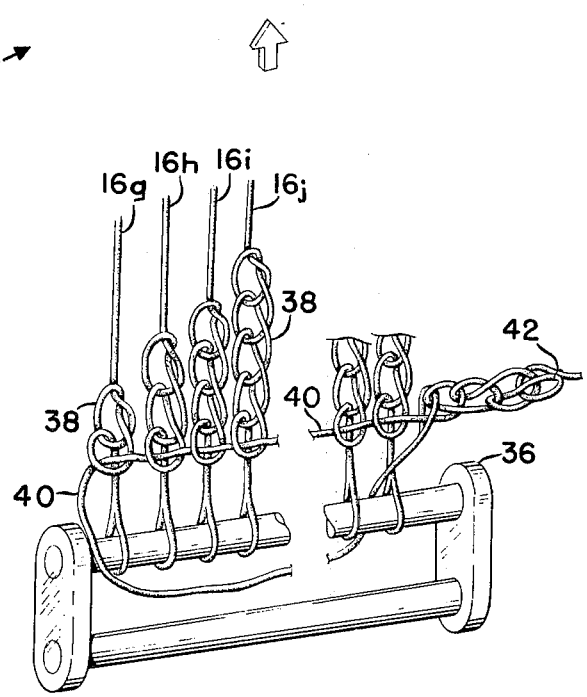
FIG. 4 is one technique for stowing and releasing the variable length canopy suspension lines by using daisy chain knots and a break cord.

FIG. 4 illustrates one technique for releasably foreshortening the extendable suspension lines, for example, 16g to 16n in FIGS. 2 and 2a. To simplify the drawing, only four suspension lines, i.e., 16g to 16j as they appear in FIGS. 2 and 2a, are illustrated attached to an aft riser link 36. In practice, a standard Navy canopy contains a total of 28 gore sections, seven suspension lines being attached to each of four riser links employed in the parachute system. In the parachute of FIGS. 2 and 2a, the suspension lines 16g to 16n are each consecutively longer. The excess line in each extendable suspension lines 16g to 16n, beyond the length of the fixed length suspension lines, 16d to 16g can be stowed conveniently by forming a plurality of consecutive slip knots 38, commonly known as daisy-chaining. Obviously, as suspension line 16j is the longest of the four suspension lines illustrated in FIG. 4, it would contain more excess line requiring more slip knots 38 to stow the excess line. The daisy-chaining in each suspension line unravels upwardly from the knot closest to link 36. These knots can be secured in ready position, to be activated by the parachutist when the occasion necessitates, by an unlocking lanyard 40 which is threaded through the first slip knot in each line and secured by a break thread 42, readily parted by the parachutist at the appropriate time. If desired, groups of releasable suspension lines could be unlocked by separate lanyards to provide a sequential operation between sets of extendable suspension lines.

Figure 5:
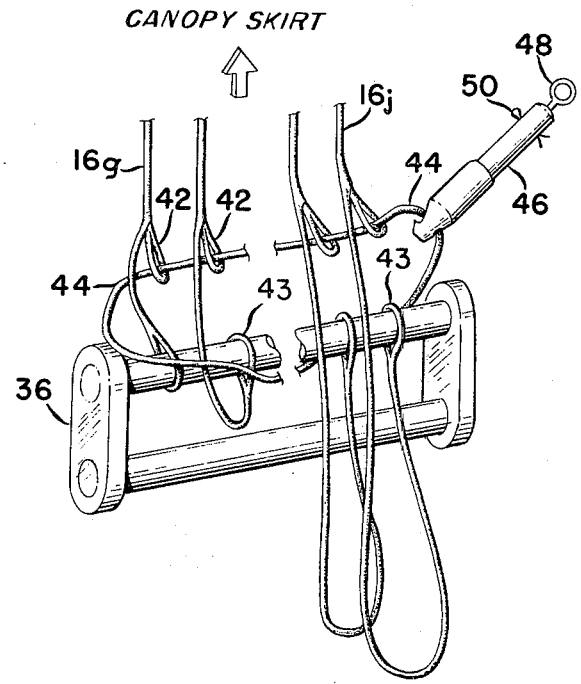
FIG. 5 shows a second technique for releasing the variable length suspension lines by using different length loops and a line cutter.

FIG. 5 illustrates another technique for locking releasable suspension lines 16g to 16j to link 36. In this modification, the excess length in each extendable suspension line, beyond the length of the fixed length suspension lines, is accommodated by a shortening loop 42 in addition to the end anchoring loop 43 in each suspension line. An unlocking lanyard 44 is threaded through each of the foreshortened loops 42 on the lines, around link 36, and thence through a conventional pyrotechnic line cutter 46 or the like. Cutter 46 may be actuated by the parachutist by withdrawing pin 48 after removal of a safety pin 50.

The novel parachute arrangement enables the standard parachute to be deployed under normal conditions with a zero lift-over-drag ratio that is, a no-drag condition, as shown in FIGS. 1 and 1a.

Should the parachutist after conventional deployment from the disabled aircraft find it advantageous to glide and steer the parachute, the no-drag condition of FIGS. 1 and 1a can be easily converted to a high lift-over-drag ratio by unlocking lanyard 40 or 44, or by any other like means. Releasing the preselected extendable suspension lines causes one or more air channels 28, 32 or 34 to be formed in the aft portion of the canopy skirt, depending on the precise arrangement and length of extendable suspension lines. Air in the high pressure region on the underside of the drag surface is spilled rearwardly through one or more of the exhaust channels formed in the skirt, providing a jet action which propels the parachute in a forward motion.

Simultaneously with the release of the extendable suspension lines, a fixed length pull down vent line 20 causes the upper portion of the drag surface to flatten, as well as lengthen, assuming a high lift-over-drag aerodynamic airfoil. Obviously, precise aerodynamic configuration of the canopy will depend on the number and arrangement of the extendable suspension lines, and the configurations in FIGS. 2 and 2a and FIGS. 3 and 3a are only illustrative of some of the arrangements that are possible to achieve with the present invention.

All of the extendable suspension lines can be released simultaneously, or sequentially singly or in groups depending on the desired results. It is obvious that the specific means for releasing the extendable lines, namely break cord 42 and line cutter 46 are only illustrative, and can be used interchangeably.

Obviously many modifications and variations of the present invention are possible in the light of the above teachings. It is therefore to be understood that within the scope of the appended claims the invention may be practiced otherwise than as specifically described.

What is claimed is:

1. A convertible canopy-to-wing shaped parachute comprising:

a normally dome-shaped canopy having a continuous and uninterrupted periphery;

a plurality of suspension lines connected at their upper ends to spaced points around said canopy skirt and connected at their lower ends to a load;

a fixed length pull down vent line connected at its upper end to the canopy apex and at its lower end to the load;

a selected number of said suspension lines having a variable length beyond their normal length;

said variable lines being graduated in length increasing in an aft direction;

means for securing said variable length suspension lines in a fore-shortened length so that all of said suspension lines in one mode of operation are of the same length;

a means for releasing said securing means and the variable length suspension lines whereby the canopy can be converted from a standard symmetrical dome-shaped configuration to a wing-like configuration having a high lift-to-drag ratio for a gliding mode.

2. The canopy of claim 1 wherein said releasing means comprises a flexible line and means for parting said line operable by the parachutist.

3. The canopy of claim 1 wherein the variable length suspension lines enable a substantial portion of the aft portion of the canopy hem to be tilted upwardly with respect to a horizontal plane.

* * * * *